US012637099B2

(12) United States Patent
Resch

(10) Patent No.: US 12,637,099 B2
(45) Date of Patent: May 26, 2026

(54) METHOD FOR ASSISTING A USER OF A VEHICLE DURING AN AUTOMATED LATERAL GUIDANCE OF THE VEHICLE ON A ROAD WITH A BRANCH, COMPUTING DEVICE AND DRIVER ASSISTANCE SYSTEM

(71) Applicant: Bayerische Motoren Werke Aktiengesellschaft, Munich (DE)

(72) Inventor: Christoph Resch, Obernzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/833,126

(22) PCT Filed: Jan. 17, 2023

(86) PCT No.: PCT/EP2023/050963
§ 371 (c)(1),
(2) Date: Jul. 25, 2024

(87) PCT Pub. No.: WO2023/143960
PCT Pub. Date: Aug. 3, 2023

(65) Prior Publication Data
US 2025/0153728 A1 May 15, 2025

(30) Foreign Application Priority Data
Jan. 31, 2022 (DE) ..................... 10 2022 102 200.5

(51) Int. Cl.
*B60W 50/14* (2020.01)
*B60W 30/12* (2020.01)
(Continued)

(52) U.S. Cl.
CPC ............ *B60W 50/14* (2013.01); *B60W 30/12* (2013.01); *B60W 50/0097* (2013.01);
(Continued)

(58) Field of Classification Search
CPC .. B60W 50/14; B60W 30/12; B60W 50/0097; B60W 60/0053;
(Continued)

(56) References Cited

U.S. PATENT DOCUMENTS 6,577,334 B1 6/2003 Kawai et al.
9,709,406 B2 * 7/2017 Bastiaensen ..... G08G 1/096861
(Continued)

FOREIGN PATENT DOCUMENTS

CN 110060493 B 11/2020
DE 199 06 614 A1 10/1999
(Continued)

OTHER PUBLICATIONS

International Search Report (PCT/ISA/210) issued in PCT Application No. PCT/EP2023/050963 dated Apr. 24, 2023 with English translation (8 pages).

(Continued)

*Primary Examiner* — Mohamed Barakat
(74) *Attorney, Agent, or Firm* — Crowell & Moring LLP

(57) ABSTRACT

A method for assisting a user of a vehicle during an automated lateral guidance of the vehicle on a road having multiple lanes includes determining map-based position data describing a current position of the vehicle in relation to the lanes on the basis of satellite-based position data and high-resolution map data, receiving sensor data from at least one environment sensor of the vehicle describing boundaries of the lanes, detecting a branch of the road on the basis of the map-based position data and/or the sensor data, wherein at least one of the lanes branches off from the remaining lanes at the branch, and actuating an output device for outputting a takeover request to the user as a function of a position of the lane with the highest stay probability relative to the at least one branching lane.

16 Claims, 5 Drawing Sheets

(51) Int. Cl.
    *B60W 50/00*      (2006.01)
    *B60W 60/00*      (2020.01)
    *G06V 20/56*      (2022.01)

(52) U.S. Cl.
    CPC ....... *B60W 60/0053* (2020.02); *G06V 20/588*
        (2022.01); *B60W 2420/403* (2013.01); *B60W*
        *2552/53* (2020.02); *B60W 2556/40* (2020.02);
        *B60W 2556/50* (2020.02)

(58) Field of Classification Search
    CPC ....... B60W 2420/403; B60W 2552/53; B60W
        2556/40; B60W 2556/50; G06V 20/588
    See application file for complete search history.

(56) References Cited

U.S. PATENT DOCUMENTS

| | | | |
|---|---|---|---|
| 10,628,671 B2 * | 4/2020 | Zang | G03B 15/006 |
| 11,776,392 B2 * | 10/2023 | Runemalm | G01S 19/13 |
| | | | 701/23 |
| 2015/0321665 A1 * | 11/2015 | Pandita | G01C 21/26 |
| | | | 701/532 |
| 2017/0197634 A1 | 7/2017 | Sato | |
| 2018/0162396 A1 * | 6/2018 | Ibuka | G08G 1/096775 |
| 2018/0170307 A1 | 6/2018 | Boran et al. | |
| 2018/0237007 A1 | 8/2018 | Adam et al. | |
| 2018/0329414 A1 | 11/2018 | Igarashi et al. | |
| 2018/0357904 A1 | 12/2018 | Miyata | |
| 2019/0367034 A1 * | 12/2019 | Okajima | B60W 10/04 |
| 2020/0116499 A1 * | 4/2020 | Jung | G06V 20/588 |
| 2020/0118426 A1 | 4/2020 | Runemalm et al. | |
| 2020/0207355 A1 * | 7/2020 | Ishioka | G08G 1/167 |
| 2021/0174668 A1 | 6/2021 | Sun et al. | |
| 2021/0284149 A1 | 9/2021 | Kato | |
| 2023/0271608 A1 | 8/2023 | De Bruin et al. | |

FOREIGN PATENT DOCUMENTS

| | | | | |
|---|---|---|---|---|
| DE | 10 2010 053 964 A1 | 8/2011 | | |
| DE | 10 2011 118 708 A1 | 5/2013 | | |
| DE | 10 2018 103 409 A1 | 8/2018 | | |
| DE | 10 2019 115 788 A1 | 12/2020 | | |
| DE | 102019215263 A1 * | 4/2021 | .......... | G06V 20/588 |
| DE | 10 2020 206 830 A1 | 12/2021 | | |
| DE | 10 2020 118 630 A1 | 1/2022 | | |
| EP | 3 901 826 A2 | 10/2021 | | |

OTHER PUBLICATIONS

German-language Written Opinion (PCT/ISA/237) issued in PCT Application No. PCT/EP2023/050963 dated Apr. 24, 2023 with English translation (10 pages).

German-language Search Report issued in German Application No. 10 2022 102 200.5 dated Oct. 17, 2022 with partial English translation (14 pages).

German-language Search Report issued in German Application No. 10 2022 102 201.3 dated Nov. 2, 2022 with partial English translation (12 pages).

U.S. Non-Final Office Action issued in U.S. Appl. No. 18/832,980 dated Sep. 29, 2025 (24 pages).

International Search Report (PCT/ISA/210) issued in PCT Application No. PCT/EP2023/050966 dated Apr. 24, 2023 with English translation (6 pages).

German-language Written Opinion (PCT/ISA/237) issued in PCT Application No. PCT/EP2023/050966 dated Apr. 24, 2023 with English translation (9 pages).

German-language Search Report issued in German Application No. 10 2022 102 202.1 dated Oct. 17, 2022 with partial English translation (13 pages).

\* cited by examiner

METHOD FOR ASSISTING A USER OF A
VEHICLE DURING AN AUTOMATED
LATERAL GUIDANCE OF THE VEHICLE
ON A ROAD WITH A BRANCH,
COMPUTING DEVICE AND DRIVER
ASSISTANCE SYSTEM

BACKGROUND AND SUMMARY

The present invention relates to a method for assisting a user of a vehicle during an automated lateral guidance of the vehicle on a road having multiple lanes. Moreover, the present invention relates to a computing device for a driver assistance system of a vehicle. Furthermore, the present invention relates to a driver assistance system having such a computing device. Finally, the present invention relates to a computer program.

The prior art discloses driver assistance systems that assist the user or driver of a vehicle in the lateral guidance of the vehicle. Such a driver assistance system, which can also be referred to as a lateral guidance system, can help to guide the vehicle within a lane and consequently to relieve the user of burden in the steering work. Such driver assistance systems can permit the user to take their hands off the steering wheel briefly. Such systems are also referred to as hands-on systems.

Lateral guidance systems today are based, for example, on sensor data from an environment sensor, in particular a camera, that describe the lane markings of a lane. These sensor data can be influenced by external environmental conditions, however. Variables derived from these sensor data, for example the lane curvature and/or the lane profile, are then susceptible to environmental influences, for example the low-lying sun or heavy rain. In the worst case, this can lead to the vehicle straying from the lane, today's lateral guidance systems being designed as hands-on systems and therefore being deemed safe despite this disadvantage.

Moreover, the prior art discloses that, in addition to the sensor data from the camera, or a front camera, sensor data from other environment sensors can also be used. By way of example, the sensor data from a radar sensor can be taken into account in an applicable fusion concept.

For future lateral guidance systems that permit the user to constantly adopt a hands-off mode, the quality of the lane information comprising the sensor data from at least one environment sensor is no longer adequate. The desired hands-off mode results in lower controllability for the user, meaning that the demands on a lane information recognition increase. For this reason, it is necessary for the lane information recognition to be improved and/or monitored on the basis of the sensor data from the environment sensors, in particular the detections of the traffic lane curvature and/or the traffic lane profile.

Moreover, the prior art discloses that the position of a vehicle can be determined on the basis of the data from a satellite-assisted position determination system and a high-resolution map. By way of example, the position of the vehicle can thus be determined with lane accuracy, or in relation to one lane of the road. Even with this map-based position determination, applicable variances and errors can arise during operation of the lateral guidance system.

It is an object of the present invention to demonstrate a solution with regard to how a user of a vehicle can be assisted more reliably and more safely during an automated lateral guidance of the vehicle.

This object is achieved according to the invention by a method, by a computing device, by a driver assistance system and by a computer program having the features according to the present disclosure. Advantageous developments are also specified in the present disclosure.

An inventive method is used to assist a user of a vehicle during an automated lateral guidance of the vehicle on a road having multiple lanes. The method comprises receiving satellite-based position data and high-resolution map data. Furthermore, the method comprises determining map-based position data that describe a present position of the vehicle in relation to the lanes on the basis of the satellite-based position data and the high-resolution map data. In addition, the method comprises receiving sensor data from at least one environment sensor of the vehicle, the sensor data describing boundaries of the lanes. Additionally, the method comprises determining the lane with the highest probability of occupancy for the vehicle on the basis of the map-based position data and/or the sensor data. Moreover, the method comprises recognition of a branch in the road on the basis of the map-based position data and/or the sensor data, the branch resulting in at least one of the lanes branching off from the other lanes. Furthermore, the method comprises actuation of an output device for outputting a takeover request to the user according to a situation of the lane with the highest probability of occupancy relative to the at least one branching lane.

During the automated lateral guidance of the vehicle, a driver assistance system of the vehicle, which can also be referred to as a lateral guidance system, can be used to perform applicable steering interventions, with the result that the vehicle is maneuvered within a lane, or the traffic lane, of the road. By way of example, the vehicle can be maneuvered by the driver assistance system in such a way that it is maneuvered centrally between the road markings of a lane. In particular, the user or driver of the vehicle can take their hands off the steering wheel continuously during the automated lateral guidance. The road is a road having at least two or more separate lanes, or traffic lanes. The road may be an urban road, a national road, a freeway-like road, a freeway or the like. Preferably, there is also provision for the driver assistance system of the vehicle to be able to be used to undertake an automated longitudinal guidance of the vehicle as well.

The method can be carried out using an applicable computing device of the vehicle, or of the driver assistance system. This computing device may be formed by at least one electronic control unit. This computing device can be used to receive the satellite-based position data, which are received for example using an applicable receiver for a satellite-assisted position determination system. The receiver can be used to receive applicable position data from a global navigation satellite system (GNSS). In particular, a so-called differential global positioning system is used, which can improve the accuracy of the position determination, or of the GNSS navigation, by transmitting correction data.

Moreover, high-resolution map data, or high-precision map data, or HD maps, are used to be able to determine the present position of the vehicle. These high-resolution map data can be received from the computing device. The high-resolution map data may be stored in a memory of the driver assistance system and/or can be received from an external computing device. The satellite-based position data and the high-resolution map data can then be taken as a basis for determining the map-based position data. The satellite-based position data and/or the map-based position data can be determined with reference to a world coordinate system. The map-based position data describe the present position of the vehicle in relation to one lane from the multiple lanes. The position of the vehicle can thus be ascertained with lane accuracy. The term "with lane accuracy" is intended to be understood in the present case to mean that, given multiple lanes, that lane from the multiple lanes that the vehicle is currently situated in is ascertained.

Moreover, the computing device can be used to receive the sensor data. These sensor data originate from at least one environment sensor of the vehicle, or of the driver assistance system. The environment sensor may be in particular a camera, or a front camera, of the driver assistance system. These sensor data, which are provided using the environment sensor, or the camera, describe the boundary or boundaries of at least one of the lanes. The boundaries may be in particular road markings. The respective road markings are used to bound the lanes. The boundary of a lane may also be a structural boundary. The boundary of the lane may also be turf or the like.

The recognized boundaries, or road markings, can be taken as a basis for determining the present position of the vehicle in relation to these boundaries, or road markings. The sensor data can be taken as a basis for ascertaining the position of the vehicle within the lane. There may furthermore be provision for the data from other environment sensors, for example radar sensors, lidar sensors or the like, to be used and to be fused with the sensor data from the camera in order to ascertain the position of the vehicle. The sensor data from the other environment sensors may also describe other road users in the lanes.

In addition, there is provision for a probability of occupancy to be determined for at least some of the lanes of the road. Preferably, that lane from the multiple lanes with the highest probability of occupancy is determined. The probability of occupancy describes in particular the probability of the vehicle being in the lane. The probability of occupancy pertaining to the vehicle can be ascertained on the basis of the map-based position data. Alternatively or additionally, there may be provision for the probability of occupancy pertaining to the vehicle to be ascertained for the lanes on the basis of the sensor data.

Moreover, there is provision for the map-based position data and/or the sensor data to be taken as a basis for recognizing a branch or fork in the lanes. The term branch is intended to be understood in the present case to mean in particular that a lane guidance of at least one branching lane differs from the lane guidance of the other lanes. The branch may be in particular a freeway fork. The at least one branching lane assigned to the branch thus in particular does not run parallel to the other lanes. This fork, or branch, in the lanes can be recognized on the basis of the map-based position data. The branch can thus be recognized on the basis of the satellite-based position data and the high-resolution map data. Alternatively or additionally, there may be provision for the branch to be recognized by also using the sensor data.

According to the present invention, there is now provision for the situation of the lane with the highest probability of occupancy relative to the at least one branching lane to be taken as a basis for actuating the output device. The output device can be actuated in such a way that a takeover request is output to the user or driver. This takeover request can result in the user being asked to manually take the wheel of the vehicle again. The user can also be asked to take their hands back to the steering wheel. During the automated lateral guidance of the vehicle, there is in particular provision for the driver to be able to take their hands off the steering wheel. A so-called hands-off function is thus provided, in particular. The takeover request can be used to deactivate this hands-off function again.

It may be the case that the map-based lane profile data are erroneous or incorrect. There may be two reasons for this: the first reason may be an incorrect mapping, that is to say an error in the map or the map data themselves. The second reason may be that the lane positioning of the vehicle is incorrect, and therefore the incorrect lane curvature is read from the map, which is actually correct. The second reason occurs much more frequently than the first reason. In particular, the second reason is addressed by the present invention.

According to the present invention, allowance is made for the information from the high-precision map and at the same time also the information from the at least one environment sensor to be able to be incorrect, or erroneous. This error is expected very rarely, but fails to meet customer demands on a hands-off function. There is therefore provision, according to the present invention, for the existence of a branching lane to result in the relative situation of the lane with the highest probability of occupancy in relation to this branching lane being taken as a basis for outputting a takeover request to the user.

The distance of the lane that the vehicle is most probably in from the branching lane can thus be taken as a basis for outputting the takeover request. If for example it is recognized that the vehicle is most probably near to the branch, or in a branching lane, a takeover request can be output to the driver or user. It is thus possible to ensure road traffic safety in that region of the branch in which erroneous map-based position data and/or erroneous sensor data can result in the threat of the vehicle straying from the lane.

Preferably, the output device for outputting the takeover request is actuated if a distance of the lane with the highest probability of occupancy from the at least one branching lane is below a predetermined minimum distance. That is to say that if for example it is recognized that the vehicle is most probably in one of the parallel lanes, or lanes that do not branch off, adjacent to the branch, the takeover request can be output. This applies even if it is recognized that the vehicle is most probably in a nonparallel lane, or a branching lane. The minimum distance may correspond to a width of one or two lanes. This means in particular that the takeover request can be output if the lane with the highest probability of occupancy is directly adjacent to the fork and/or is at a distance of one lane from the fork. Safety can thus be ensured even in the event of erroneous map-based position data and/or erroneous sensor data.

There may also be provision for the probabilities of occupancy to be determined for the lanes that are adjacent to the lane with the highest probability of occupancy. If these neighboring or adjacent lanes have a relatively high probability of occupancy and/or a difference from the highest probability of occupancy is small, the distance from the at least one branching lane can be taken as a basis for outputting a takeover request. In particular, the takeover request can be output if the neighboring lanes have a high probability of occupancy and/or if the neighboring lanes are adjacent to the branch.

Furthermore, it is advantageous if map-based lane profile data that describe a future desired movement of the vehicle in relation to the lanes on the basis of the map-based position data are determined. Moreover, there is preferably provision for sensor-based lane profile data that describe a future desired movement of the vehicle in relation to the lanes on the basis of the sensor data to be determined. The satellite-based position data and the high-resolution map data can be taken as a basis for ascertaining first the map-based position data and then the map-based lane profile data. These map-based lane profile data describe the future desired movement of the vehicle in relation to one lane from the multiple lanes of the road. The future lane profile of the vehicle can therefore be ascertained with lane accuracy, or in relation to one of the lanes. The sensor data can also be taken as a basis for determining the sensor-based lane profile data that describe the future desired movement of the vehicle.

Preferably, there is also provision for the map-based lane profile data and the sensor-based lane profile data to be compared with one another. Both the map-based lane profile data and the sensor-based lane profile data can describe the present and/or future movement of the vehicle. The future movement of the vehicle can also be determined by taking account of the present steering angle of the vehicle and/or planned steering interventions. The respective lane profile data can describe a trajectory and/or a driving path. A difference or a variance can be ascertained between the map-based lane profile data and the sensor-based lane profile data. In other words, this means in particular that the lane information determined on the basis of the sensor data from the front camera and the lane information ascertained on the basis of the high-precision map are compared with one another. If the map-based lane profile data differ too greatly from the sensor-based lane profile data, for example, the computing device can be used to actuate the output device for outputting the takeover request.

There is preferably provision for the difference between the map-based lane profile data and the sensor-based lane profile data to be determined continually. By way of example, the difference between the map-based lane profile data and the sensor-based lane profile data can be determined periodically, or within predetermined time intervals and/or predetermined distance intervals. This can occur continually during the automated lateral guidance of the vehicle. If a branch or fork in the lanes is now additionally recognized, the takeover request can also be output on the basis of the probabilities of occupancy and/or the range of the lane with the highest probability of occupancy from the branch.

According to the present invention, the takeover request is output, or the function is switched off, on the basis of the probability of occupancy. This occurs for the following reason, or for the following reasons: if the vehicle is in a branching lane or next to a branching lane and then the sensor data and at the same time also the map data are incorrect, the difference between the map-based lane profile data and the sensor-based lane profile data does not result in an error. In this case, it is assumed that everything is in order and there is no error. In fact, the vehicle selects the incorrect lane profile, however, leading to its straying from the road. It may also happen that the vehicle is in a region of lanes that are (all) parallel. Here, it may be the case that the map-based lane profile data and the sensor-based lane profile data incorrectly describe the adjoining lane, or the adjacent lane. In this case, this does not lead to the vehicle straying from the road, however, because the incorrectly detected adjoining lane has the same profile as the lane of the ego vehicle. That is to say that the correct profile is still selected here.

In another embodiment, the map-based lane profile data and/or the sensor-based lane profile data are taken as a basis for determining a path planning for a future automated lateral guidance of the vehicle if a distance of the lane with the highest probability of occupancy from the fork is above a predetermined minimum distance. That is to say that if the traffic lane, or lane, with the highest probability of occupancy is far enough away from the fork, or the nonparallel lane, the map-based lane profile data and/or the sensor-based lane profile data can be used for the path planning.

The map-based lane profile data and/or the sensor-based lane profile data can also be used for the path planning, or the future automated lateral guidance, of the vehicle if the difference between the map-based lane profile data and the sensor-based lane profile data is below a predetermined threshold value. The lateral guidance can, in principle, be performed on the basis of the map-based lane profile data or the sensor-based lane profile data alone. The respective other lane profile data can then be used for verification or plausibility checking. There may also be provision for the path planning to be performed both on the basis of the map-based data and on the basis of the sensor-based lane profile data. The path planning determined can then be taken as a basis for performing the lateral guidance control of the vehicle and therefore intervening in the steering of the vehicle.

Furthermore, it is advantageous if the takeover request is output in such a way that the vehicle is prevented from leaving the lane until a probable time of a takeover by the user. In other words, the takeover request to the user is supposed to occur early enough for the user to still have sufficient time to take the steering wheel and for lane departure not to occur. In particular, there is provision for the takeover request to be output immediately when the difference between the map-based lane profile data and the sensor-based lane profile data is above the predetermined threshold value and/or if the distance of the lane with the highest probability of occupancy is below the minimum distance from the branch. In principle, the present speed, the profile of the lane and the steering angle can be taken as a basis for determining the time at which the lane will be left. The probable time at which the wheel will be taken by the user can also be estimated. It is thus possible to prevent the vehicle from leaving the lane.

An inventive computing device for a driver assistance system of a vehicle is configured to carry out an inventive method and the advantageous refinements thereof. The computing device may be formed by at least one electronic control unit of the vehicle. In principle, the computing device may have at least one processor and/or a memory element.

An inventive driver assistance system for a vehicle comprises an inventive computing device. Moreover, the driver assistance system comprises an output device for outputting a takeover request to a user of the vehicle. This output device may be designed to output the takeover request to the user visually, audibly and/or haptically. In addition, the driver assistance system is configured to perform an automated lateral guidance of the vehicle.

The driver assistance system may have at least one environment sensor that can be used to provide the sensor data that describe the road markings, or boundaries. This environment sensor may preferably be in the form of a camera, or front camera. Moreover, the driver assistance system may have other environment sensors, which may be in the form of a radar sensor, a lidar sensor or the like, for example. Moreover, the driver assistance system may have a receiver for a satellite-assisted position determination system. Additionally, the driver assistance system may have a memory, or a memory device, that stores a high-resolution map, or a so-called HD map.

An inventive vehicle comprises an inventive driver assistance system. The vehicle is in particular in the form of a passenger vehicle.

Another aspect of the invention relates to a computer program comprising commands that, when the program is executed by a computing device, cause said computing device to carry out an inventive method and the advantageous refinements thereof. In addition, the invention relates to a computer-readable (storage) medium comprising commands that, when executed by a computing device, cause said computing device to carry out an inventive method and the advantageous refinements thereof.

The preferred embodiments presented with reference to the inventive method, and the advantages of said embodiments, apply mutatis mutandis to the inventive computing device, to the inventive driver assistance system, to the inventive vehicle, to the inventive computer program and to the inventive computer-readable (storage) medium.

Other features of the invention are obtained from the claims, the figures and the description of the figures. The features and combinations of features that are mentioned in the description hereinabove and the features and combinations of features that are mentioned in the description of the figures hereinbelow and/or shown in the figures alone can be used not only in the respectively indicated combination but also in other combinations or on their own without departing from the scope of the invention.

The invention will now be explained in more detail on the basis of preferred exemplary embodiments and with reference to the accompanying drawings.

DETAILED DESCRIPTION OF THE DRAWINGS

In the figures, identical or functionally identical elements are provided with the same reference signs.

Figure 1:
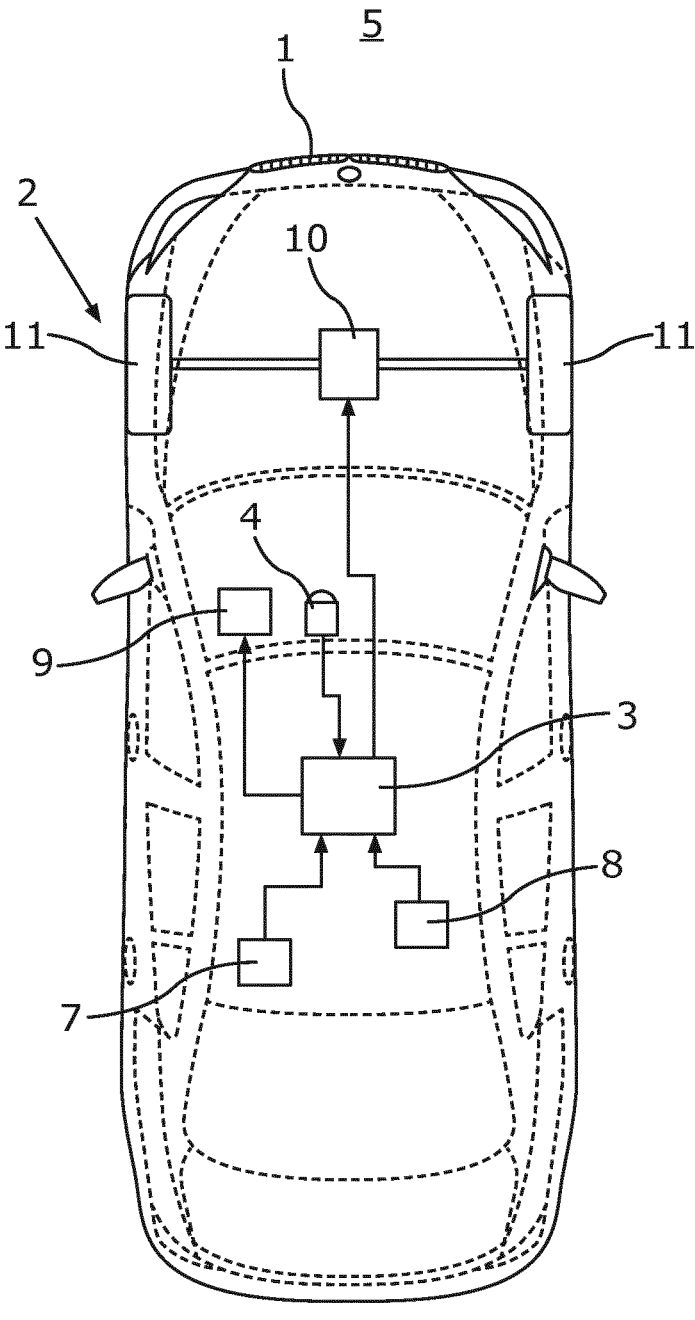
FIG. 1 shows a schematic representation of a vehicle that has a driver assistance system for assisting a user of the vehicle in a lateral guidance of the vehicle.

FIG. 1 shows a vehicle 1, which is in the form of a passenger vehicle in the present case, in a plan view. The vehicle 1 comprises a driver assistance system 2 that is configured to assist a user, or driver, of the vehicle 1 in a lateral guidance of the vehicle 1. In particular, the driver assistance system 2 is used to undertake an automated lateral guidance of the vehicle 1. Preferably, the driver assistance system 2 can undertake the lateral guidance in such a way that the user can take their hands off the steering wheel continuously.

The driver assistance system 2 comprises a computing device 3, which may be formed by at least one electronic control unit of the vehicle 1, for example. Moreover, the driver assistance system 2 comprises at least one environment sensor 4, which is in the form of a camera, or front camera, in the present case. The environment sensor 4 can be used to provide sensor data that describe surroundings 5 of the vehicle 1. In particular, the sensor data, or the image data, can describe boundaries of lanes 13, in particular road markings 6, of a road 12. The sensor data can be transmitted from the environment sensor 4, or the camera, to the computing device 3.

In addition, the driver assistance system 2 comprises a receiver 7 for a satellite-assisted position determination system. The receiver 7 can be used to determine satellite-based position data that describe the position of the vehicle 1. Moreover, the driver assistance system 2 comprises a memory device 8 that stores high-resolution map data, or so-called HD maps. Additionally, the driver assistance system 2 comprises an output device 9 that can be used to output an output to the user of the vehicle 1. This output can be output visually, audibly and/or haptically, in principle.

Moreover, the computing device 3 is configured to actuate a steering system 10 of the vehicle 1, which steering system is depicted only schematically in the present case. By actuating the steering system 10 it is possible to undertake the lateral guidance of the vehicle 1. Actuating the steering system 10 allows steerable wheels 11 of the vehicle 1 to be moved. Preferably, there is also provision for the computing device 3 to be able to be used to actuate a drive motor and/or a braking system of the vehicle 1 in order to also undertake the longitudinal guidance of the vehicle 1.

Figure 2:
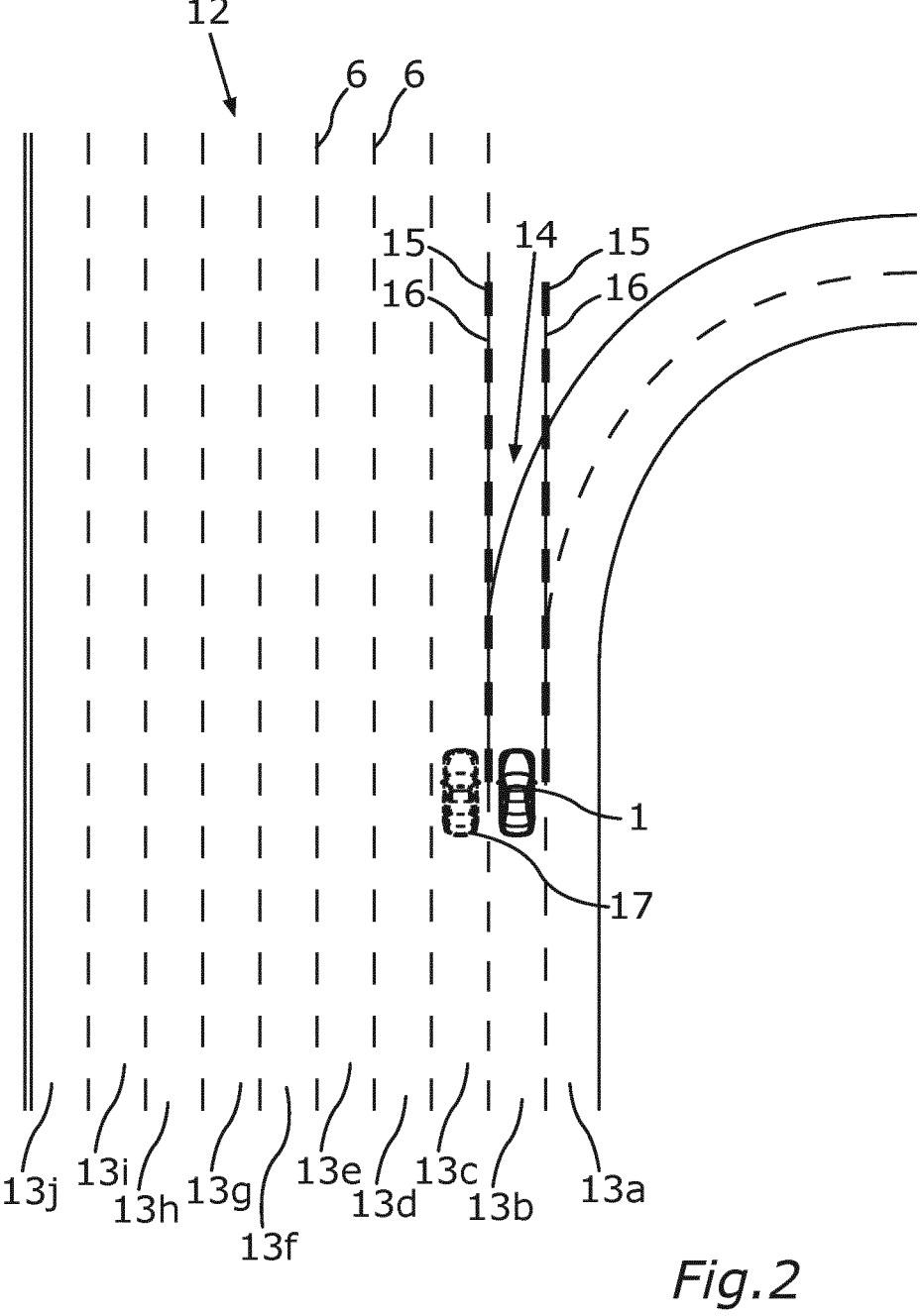
FIG. 2 shows a schematic representation of a road that comprises a plurality of lanes, and also sensor-based lane profile data and map-based lane profile data.

FIG. 2 shows a schematic representation of the vehicle 1, which is on a multilane road 12. The road 12 is in the form of a freeway in the present case and comprises ten lanes 13a to 13j, which are separated from one another by road markings 6. The multilane road 12 comprises a branch 14, or fork. This branch 14 results in the first lane 13a and the second lane 13b branching off from the other lanes 13c to 13j. The lanes 13a and 13b are referred to as branching lanes, or nonparallel lanes, hereinbelow. The lanes 13c to 13j run parallel, or in a first direction of travel. The lanes 13a and 13b run nonparallel to the other lanes 13c to 13j, or run in a second direction of travel.

Moreover, FIG. 2 shows a schematic representation of map-based lane profile data 15 that are determined on the basis of the satellite-based position data from the receiver 7 for the satellite-assisted position determination system and the high-resolution map. The map-based lane profile data 15 can be taken as a basis for ascertaining the, or the future, desired movement, or desired trajectory, of the vehicle 1 within one of the lanes 13a to 13j.

In addition, FIG. 2 shows a schematic representation of sensor-based lane profile data 16 that also describe the, or the future, desired movement of the vehicle 1 in relation to the lanes 13a to 13j. These sensor-based lane profile data 16 are determined on the basis of the sensor data from the at least one environment sensor 4. In the present case, the map-based lane profile data 15 and the sensor-based lane profile data 16 are each illustrated as trajectories.

In the example in FIG. 2, the vehicle 1 is in the second lane 13b, that is to say in one of the nonparallel lanes, or branching lanes. The sensor-based lane profile data 16 here describe not a branching profile of the lane 13b, but rather a parallel profile. The reason for this may be the relatively short range of the camera, and/or extrapolation. The map-based lane profile data 15 here also erroneously indicate that the vehicle 1 is in the third lane 13c, which does not branch off, or runs parallel. This is illustrated by the vehicle symbol 17 in the present case. The reason for the incorrect map-based lane profile data 15 may be twofold here: first, there may be an incorrect mapping, that is to say an error in the map. Secondly, the lane positioning of the vehicle 1 may be incorrect and therefore the incorrect lane curvature may be read from the map, which is actually correct. The latter problem occurs much more frequently than the first problem.

If the automated lateral guidance of the vehicle 1 is now performed on the basis of the incorrect map-based lane profile data 15 and at the same time the incorrect sensor-based lane profile data 16, this can lead to the vehicle 1 straying from the lane 13b. The reason for this is that the map-based lane profile data 15 and the sensor-based lane profile data 16 are both equally incorrect at the same time, and therefore no variance is identified when the two lane profiles are compared. Therefore no error is recognized by the driver assistance system 2, and the vehicle 1 follows the incorrect lane profile.

Figure 3:
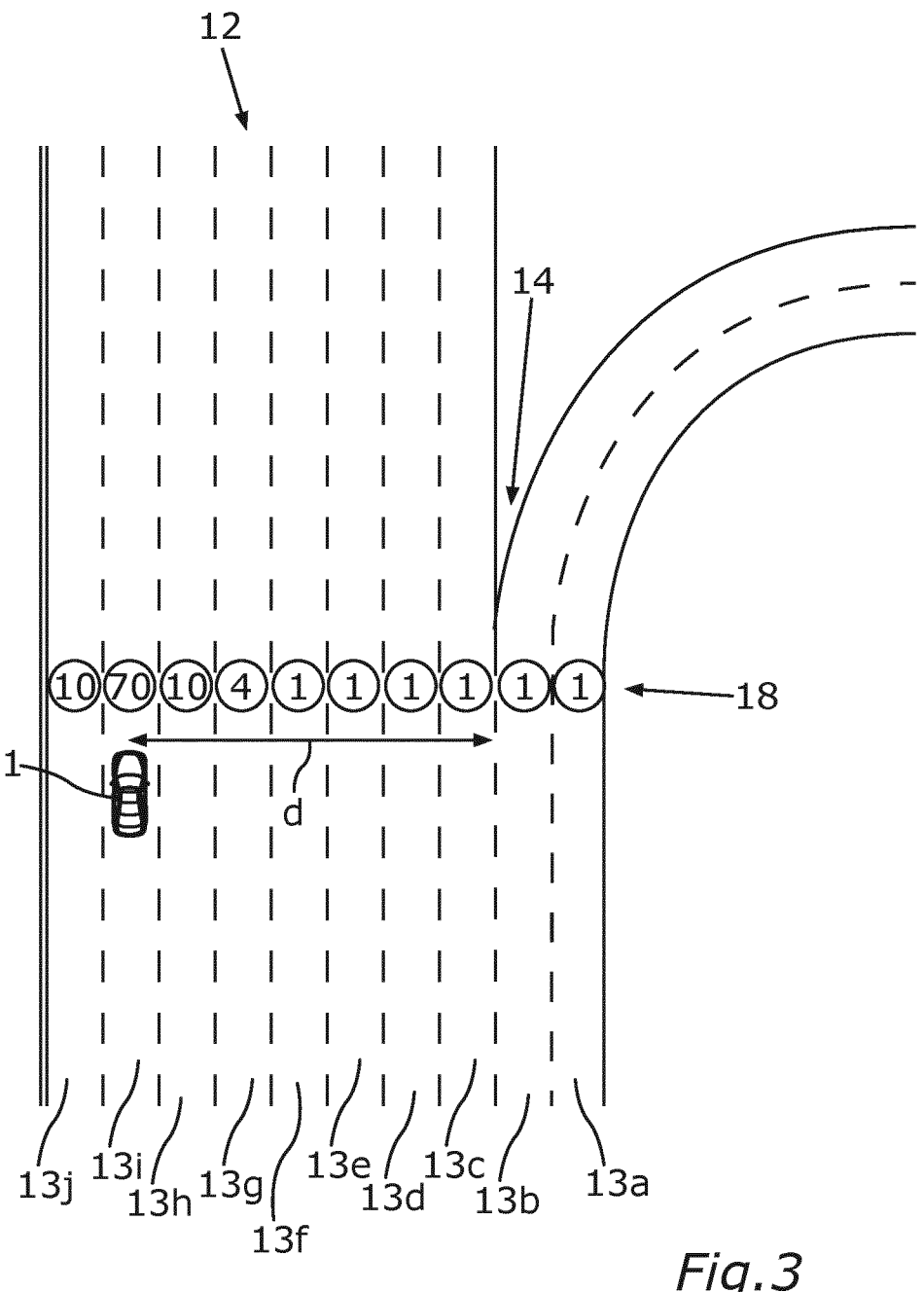
FIG. 3 shows a schematic representation of the vehicle shown in FIG. 1, which is on a multilane road, and also respective probabilities of occupancy for the lanes.

FIG. 3 shows the vehicle 1 on the multilane road 12 in accordance with another embodiment. In this case, probabilities of occupancy have been determined for the respective lanes 13a to 13j, which describe the probability of the vehicle 1 being in the respective lanes 13a to 13j. In the present case, the respective probabilities of occupancy pertaining to the lanes 13a to 13j are indicated as a percentage in a region 18 of FIG. 3. In the present case, the vehicle 1 has a probability of 70% of being in the ninth lane 13i. The ninth lane 13i has the highest associated probability of occupancy in the present case.

In addition, a distance d between the lane with the highest probability of occupancy and the closest branching lane 13b is determined. In the present case, this distance is determined, by way of illustration, from the middle of the lane 13i with the highest probability of occupancy to the boundary, or closest road marking 6, of the branching lane 13b. In addition, a check is performed to determine whether this distance d is shorter than a predetermined minimum distance. This minimum distance may correspond to the width of one or two lanes 13a to 13f, for example.

In the example in FIG. 3, the distance d is not below the predetermined minimum distance. In this case, the vehicle 1 can be maneuvered by the driver assistance system 2 in such a way that the driver assistance system 2 undertakes the lateral guidance and the user can take their hands off the steering wheel continuously. This so-called hands-off function is not deactivated in this case, because there is a very high probability that the lane profile on the high-precision map will be correct and the vehicle 1 will thus not stray from the road 12. In addition, the lanes 13j and 13h beside the lane 13i with the highest probability of occupancy have the same lane profile as the lane 13i with the highest probability of occupancy. It therefore does not make much difference to the lateral control whether the vehicle 1 is positioned one lane further to the right or left.

Figure 4:
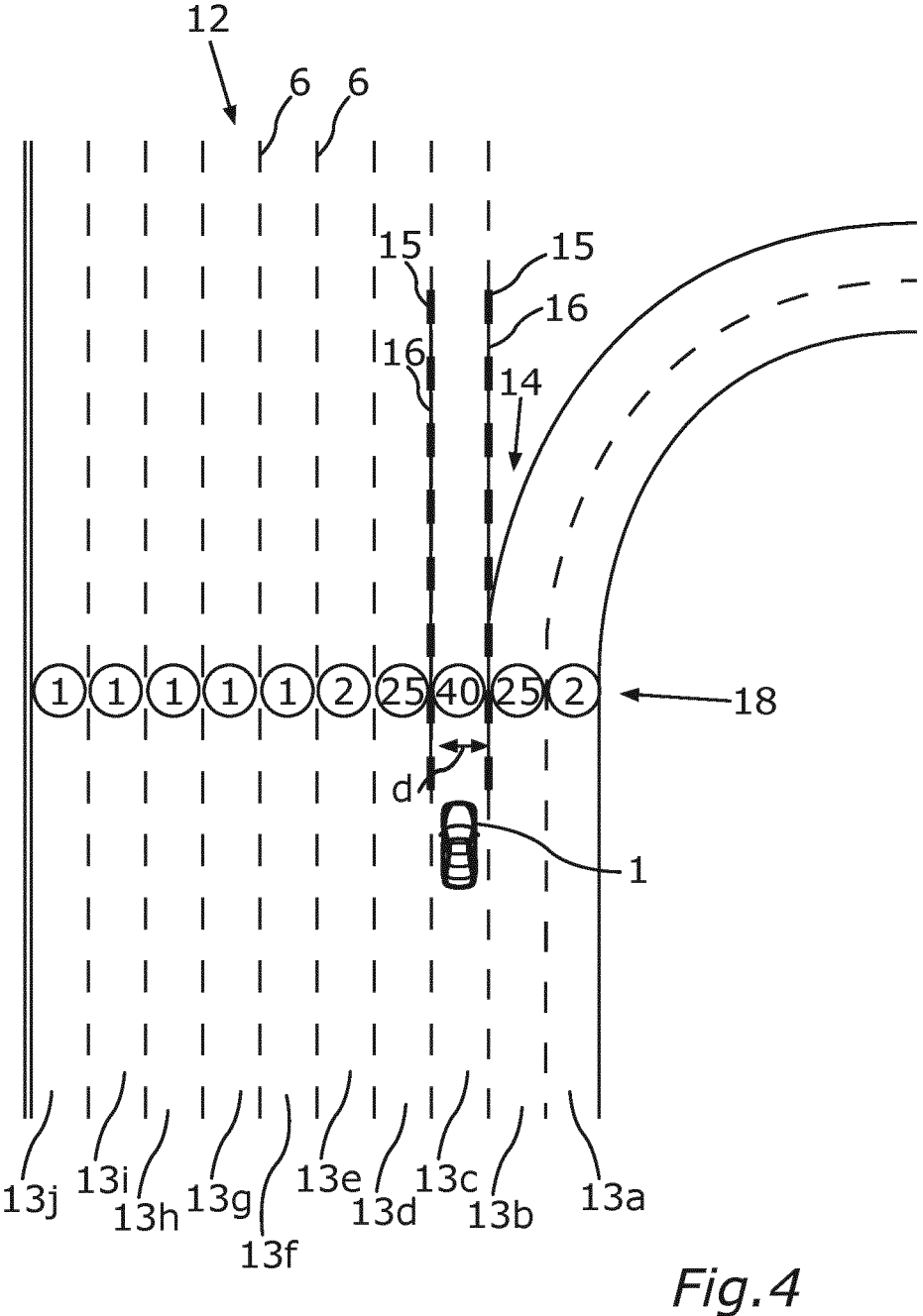
FIG. 4 shows the vehicle, which is on a multilane road, and also the respective probabilities of occupancy according to another embodiment.

By comparison, FIG. 4 shows the vehicle 1 on the multilane road 12 in accordance with another exemplary embodiment. Here, the vehicle 1 has a probability of 40% of being in the third lane 13c, which is directly adjacent to the branch 14, or the branching lanes 13a and 13b. Furthermore, the distance d is also below the predetermined minimum distance from the branch 14, or the branching lanes. The hands-off function is deactivated in this case, since the risk of the vehicle 1 being positioned in an incorrect lane is too high. Moreover, the probabilities of occupancy pertaining to the two lanes 13b and 13d, which are located next to the lane 13c with the highest probability of occupancy, is relatively high at 25%.

Figure 5:
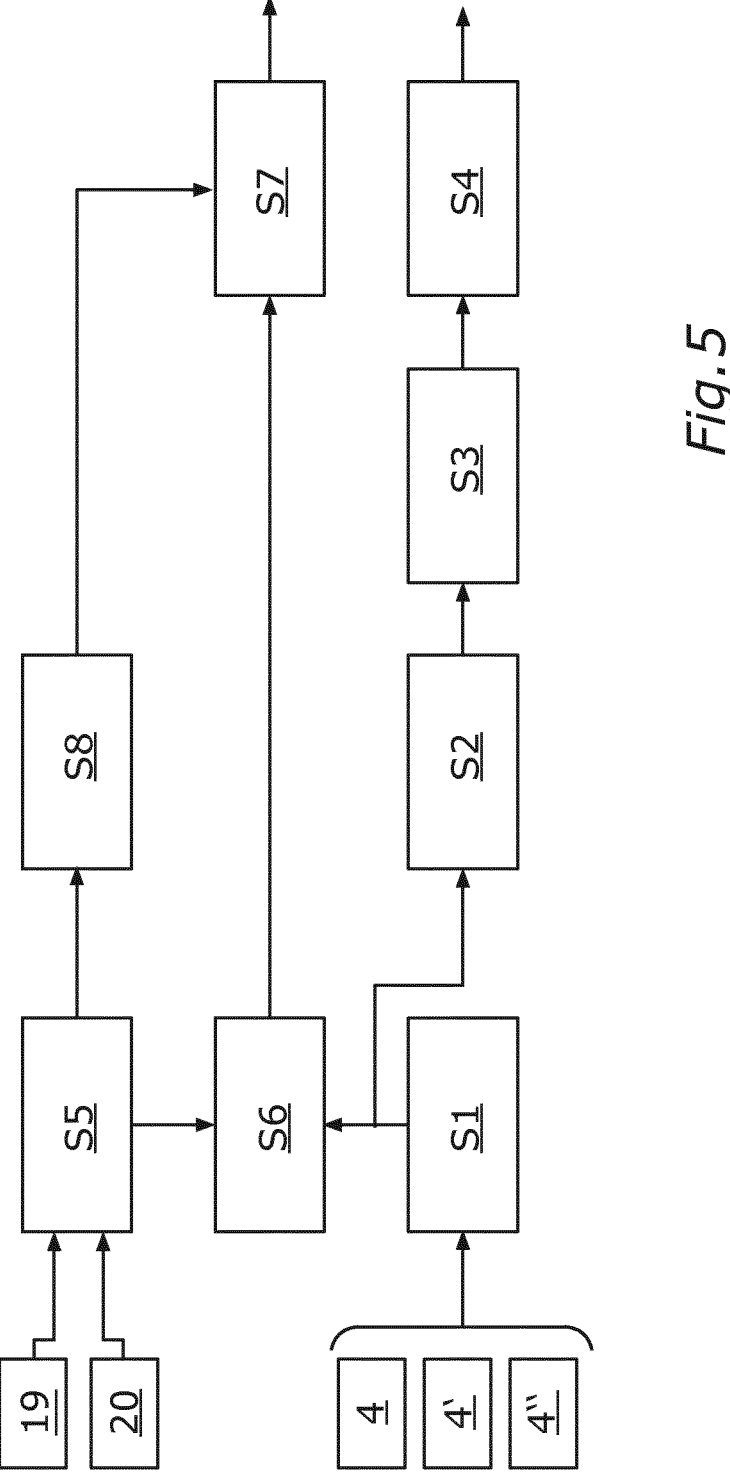
FIG. 5 shows a schematic flowchart for a method for assisting a user in a lateral guidance of the vehicle.

FIG. 5 shows a schematic flowchart for a method for assisting the user in the lateral guidance of the vehicle 1.

First, the sensor data from the environment sensor 4, or the camera, are provided. Additionally, other sensor data from other environment sensors 4', 4"can also be provided. The sensor data can also be fused as appropriate. In a step S1, the sensor-based lane profile data 16 are then determined. Next, in a step S2, a path planning for the vehicle 1 can then be determined. Moreover, in a step S3, control can be performed and, in a step S4, the steering system 10 of the vehicle 1 can be actuated, so that the resultant vehicle movement is obtained.

The high-resolution map data 19 and the satellite-based position data 20 can then be taken as a basis for determining the map-based lane profile data 15 in a step S5. Alternatively or additionally, there may also be provision for the path planning, the control and the actuation of the steering system 10 in accordance with steps S2 to S4 to be performed on the basis of the map-based lane profile data 15.

In a step S6, the map-based lane profile data 15 are then compared with the sensor-based lane profile data 16. Depending on the result of the comparison, it can then be decided whether or not the hands-off function is deactivated. In a step S7, functional or display logic in regard to the hands-off function then ensues. If a difference between the map-based lane profile data 15 and the sensor-based lane profile data 16 is above a predetermined threshold value, a takeover request is output to the user.

Moreover, there is provision for the takeover request to be output to the driver in a step S8 on the basis of the respective probabilities of occupancy for the lanes 13a to 13j and/or on the basis of the distance d between the lanes 13a to 13j with the highest probability of occupancy and the at least one branching lane 13a, 13b.

The invention claimed is:

1. A method for assisting a user of a vehicle during an automated lateral guidance of the vehicle on a road having multiple lanes, the method comprising:
   receiving satellite-based position data and high-resolution map data;
   determining map-based position data that describes a present position of the vehicle in relation to the lanes on a basis of the satellite-based position data and the high-resolution map data;
   receiving sensor data from at least one environment sensor of the vehicle, the sensor data describing boundaries of the lanes;
   determining a lane with a highest probability of occupancy for the vehicle on a basis of the map-based position data and/or the sensor data;
   recognizing a branch in the road on a basis of the map-based position data and/or the sensor data, the branch resulting in at least one of the lanes branching off from the other lanes; and
   actuating an output device for outputting a takeover request to the user according to a situation of the lane with the highest probability of occupancy relative to the at least one branching lane;
   wherein actuating the output device comprises outputting the takeover request when (i) a distance of the lane with the highest probability of occupancy to the at least one branching lane is less than a predetermined minimum distance, and (ii) at least one lane neighboring the lane with the highest probability of occupancy has a probability of occupancy above a predetermined threshold and is adjacent to the branch.

2. The method according to claim 1, comprising:
   wherein the predetermined minimum distance is not greater than a width of two lanes.

3. The method according to claim 1, comprising:

determining map-based lane profile data that describes a future desired movement of the vehicle in relation to the lanes on a basis of the map-based position data;

determining sensor-based lane profile data that describes a future desired movement of the vehicle in relation to the lanes on a basis of the sensor data;

comparing the map-based lane profile data and the sensor-based lane profile data; and actuating the output device for outputting the takeover request when a difference between the map-based lane profile data and the sensor-based lane profile data is below a predetermined threshold and the branch is recognized.

4. The method according to claim 3, comprising:

determining a path planning for a future automated lateral guidance of the vehicle based on the map-based lane profile data and/or the sensor-based lane profile data in response to the distance of the lane with the highest probability of occupancy from the at least one branching lane being above the predetermined minimum distance, and when a difference between the map-based lane profile data and the sensor-based lane profile data is below a predetermined threshold.

5. The method according to claim 1, comprising:

outputting the takeover request such that the vehicle is prevented from leaving the lane until a probable time of a takeover by the user.

6. A computing device for a driver assistance system of a vehicle, comprising:

at least one processor and at least one non-transitory memory storing program instructions that, when executed by the at least one processor, cause the computing device to:

during an automated lateral guidance of the vehicle:

receive satellite-based position data and high-resolution map data;

determine map-based position data that describes a present position of the vehicle in relation to lanes on a basis of the satellite-based position data and the high-resolution map data;

receive sensor data from at least one environment sensor of the vehicle, the sensor data describing boundaries of the lanes;

determine the lane with a highest probability of occupancy for the vehicle on a basis of the map-based position data and/or the sensor data;

recognize a branch in the road on a basis of the map-based position data and/or the sensor data, the branch resulting in at least one of the lanes branching off from the other lanes;

determine a distance between the lane with the highest probability of occupancy and the at least one branching lane and determine probabilities of occupancy for lanes neighboring the lane with the highest probability of occupancy; and, actuate an output device to output a takeover request to the user when the distance is less than a predetermined minimum distance and when at least one lane neighboring the lane with the highest probability of occupancy has a probability of occupancy above a predetermined threshold and is adjacent to the branch.

7. The computing device according to claim 6, wherein the predetermined minimum distance corresponds to a width of one or two lanes.

8. The computing device according to claim 6, wherein the computing device is configured to:

determine map-based lane profile data that describes a future desired movement of the vehicle in relation to the lanes on a basis of the map-based position data;

determine sensor-based lane profile data that describes a future desired movement of the vehicle in relation to the lanes on a basis of the sensor data;

compare the map-based lane profile data and the sensor-based lane profile data; and, actuate the output device for outputting the takeover request when a difference between the map-based lane profile data and the sensor-based lane profile data is below a predetermined threshold and the branch is recognized.

9. The computing device according to claim 8, wherein the computing device is configured to:

determine a path planning for a future automated lateral guidance of the vehicle based on the map-based lane profile data and/or the sensor-based lane profile data in response to the distance of the lane with the highest probability of occupancy from the at least one branching lane being above the predetermined minimum distance, and when a difference between the map-based lane profile data and the sensor-based lane profile data is below a predetermined threshold.

10. The computing device according to claim 6, wherein the computing device is configured to:

output the takeover request such that the vehicle is prevented from leaving the lane until a probable time of a takeover by the user.

11. A driver assistance system for a vehicle, comprising:

the computing device according to claim 6; and the output device for outputting the takeover request to the user of the vehicle, wherein the driver assistance system is configured for automated lateral guidance of the vehicle.

12. A non-transitory computer readable medium having stored thereon a computer program comprising commands that, when executed by a computing device, cause the computing device to carry out a method comprising:

receiving satellite-based position data and high-resolution map data;

determining map-based position data that describes a present position of the vehicle in relation to lanes on a basis of the satellite-based position data and the high-resolution map data;

receiving sensor data from at least one environment sensor of the vehicle, the sensor data describing boundaries of the lanes;

determining a lane with a highest probability of occupancy for the vehicle on a basis of the map-based position data and/or the sensor data;

recognizing a branch in the road on a basis of the map-based position data and/or the sensor data, the branch resulting in at least one of the lanes branching off from the other lanes; and actuating an output device for outputting a takeover request to the user according to a situation of the lane with the highest probability of occupancy relative to the at least one branching lane;

wherein actuating the output device comprises outputting the takeover request when (i) a distance of the lane with the highest probability of occupancy to the at least one branching lane is less than a predetermined minimum distance, and (ii) at least one lane neighboring the lane with the highest probability of occupancy has a probability of occupancy above a predetermined threshold and is adjacent to the branch.

13. The non-transitory computer readable medium according to claim 12, wherein the predetermined minimum distance corresponds to not greater than a width of two lanes.

14. The non-transitory computer readable medium according to claim 12, wherein the commands, when executed by a computing device, cause the computing device to carry out the method comprising:

determining map-based lane profile data that describes a future desired movement of the vehicle in relation to the lanes on a basis of the map-based position data;

determining sensor-based lane profile data that describes a future desired movement of the vehicle in relation to the lanes on a basis of the sensor data;

comparing the map-based lane profile data and the sensor-based lane profile data; and actuating the output device for outputting the takeover request when a difference between the map-based lane profile data and the sensor-based lane profile data is below a predetermined threshold and the branch is recognized.

15. The non-transitory computer readable medium according to claim 14, wherein the commands, when executed by a computing device, cause the computing device to carry out the method comprising:

determining a path planning for a future automated lateral guidance of the vehicle based on the map-based lane profile data and/or the sensor-based lane profile data in response to the distance of the lane with the highest probability of occupancy from the at least one branching lane being above the predetermined minimum distance, and when a difference between the map-based lane profile data and the sensor-based lane profile data is below a predetermined threshold.

16. The non-transitory computer readable medium according to claim 12, wherein the commands, when executed by a computing device, cause the computing device to carry out the method comprising:

outputting the takeover request such that the vehicle is prevented from leaving the lane until a probable time of a takeover by the user.

\* \* \* \* \*